United States Patent [19]

Kato

[11] 4,274,768
[45] Jun. 23, 1981

[54] TAPPING SPINDLE

[76] Inventor: Taizo Kato, 3007-104, Obatahigashijima, Moriyamaku, Nagoya, Japan

[21] Appl. No.: 38,704

[22] Filed: May 14, 1979

[30] Foreign Application Priority Data

May 15, 1978 [JP] Japan .............................. 53-65587[U]

[51] Int. Cl.³ ........................... B23G 1/46; B23G 3/00
[52] U.S. Cl. ................................... 408/142; 10/89 F; 10/89 H; 10/141 H; 408/139
[58] Field of Search ................ 408/139, 142; 10/89 F, 10/89 H, 141 H

[56] References Cited

U.S. PATENT DOCUMENTS

| 2,723,406 | 11/1955 | Angst | 10/89 H X |
| 3,829,230 | 8/1974 | Johnson | 408/142 X |
| 4,090,806 | 5/1978 | Kato | 408/139 |

Primary Examiner—Z. R. Bilinsky
Attorney, Agent, or Firm—Merriam, Marshall & Bicknell

[57] ABSTRACT

This disclosure relates to a tapping spindle including an automatic depth control. The spindle includes coaxial, telescoping driving and driven cylinders, and axial slot-like openings are formed in the cylinders. A slidable roller fits in the openings and normally engages the cylinders. The openings are shaped so that the roller disengages the cylinders upon sufficient relative axial movement thereof, and means is provided to adjust the depth at which the disengagement occurs. A spring is also provided to absorb shock when the tap begins to bite into the workpiece.

3 Claims, 7 Drawing Figures

FIG. 3
FIG. 4
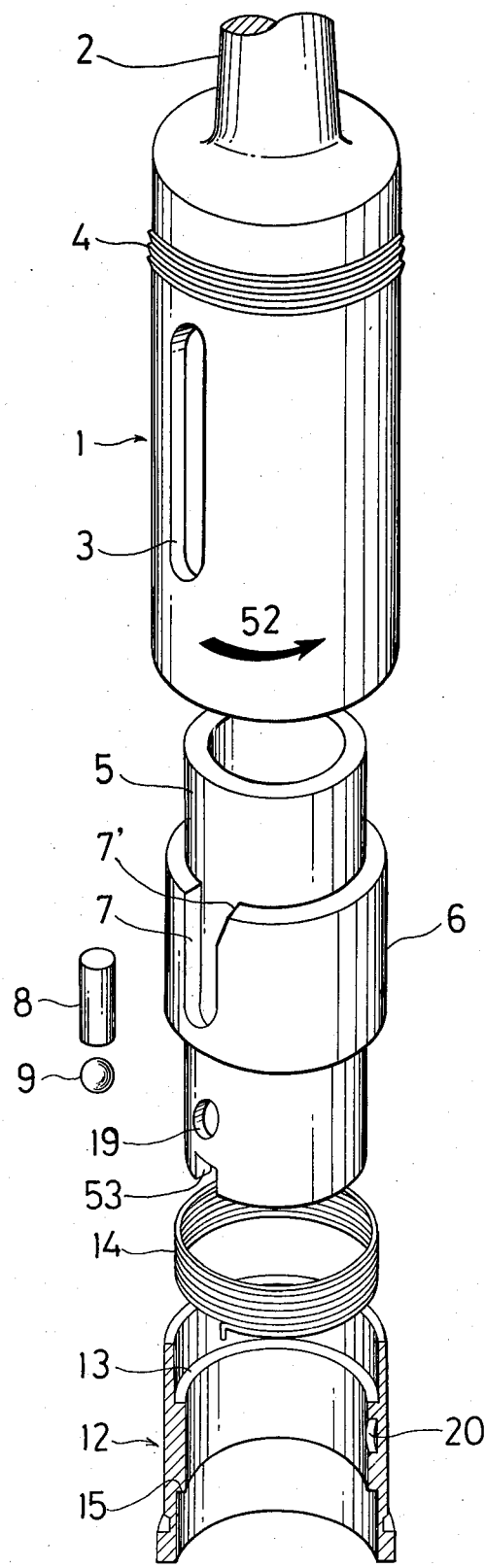
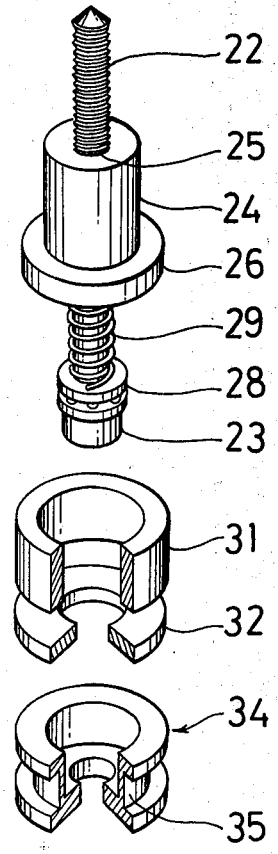

TAPPING SPINDLE

The present invention relates to a tapping spindle with automatic depth control means adapted to disengage the spindle at a predetermined depth.

Although various spindles of this kind have conventionally been used, there have been put in practice very few types of spindles having, in addition to a depth control, means for holding the socket member, to which a tap is attached, normally in equilibrium relative to the driving cylinder by a spring or the like to absorb the shock when the tap strikes or begins biting into a piece of work, because such means is complex in construction and the depth control requires troublesome replacement or exchange of many parts.

It is an object of the invention to provide a tapping spindle adapted to automatically disengage or stop tapping at a predetermined depth by simply presetting the depth and to remove the tap from the work by reversely rotating the spindle.

It is another object thereof to provide a tapping spindle adapted to absorb the shock when the tap begins biting the work.

The invention will be described hereinafter in detail by way of a preferred embodiment with reference to the accompanying drawings wherein:

FIGS. 3–5 are enlarged exploded views of major parts thereof;

Figure 1:
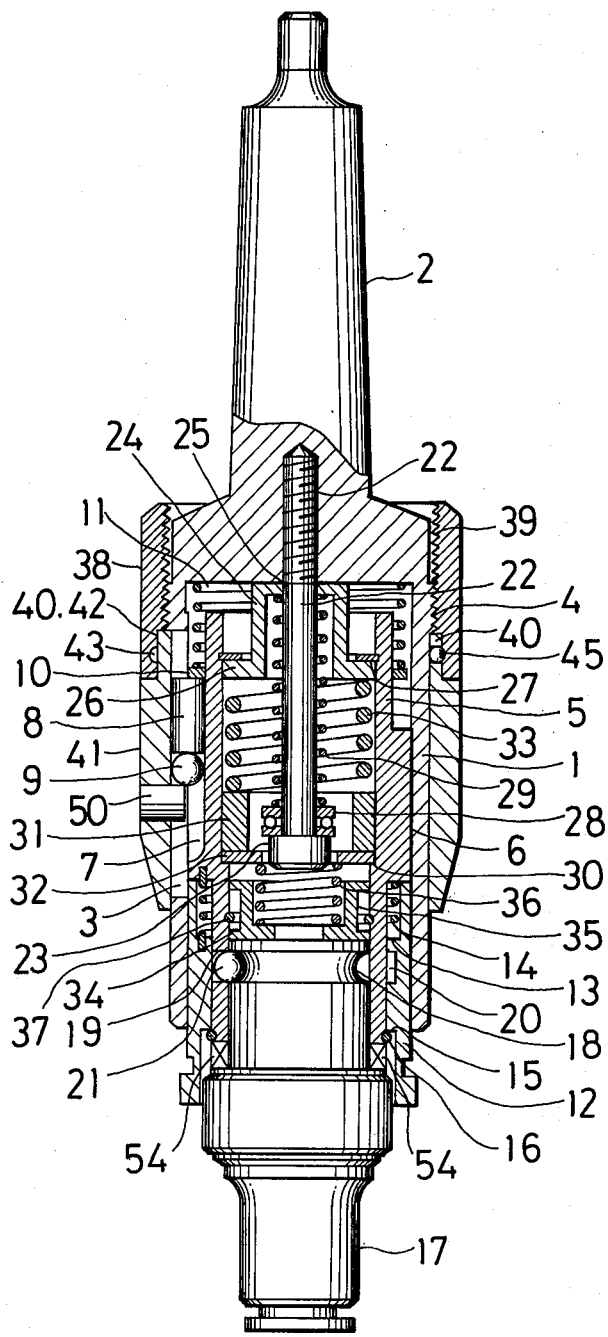
FIG. 1 is a side view partially in axial section of a spindle according to this invention.

First reference is made to FIGS. 1 and 3. A driving cylinder 1 having a shank 2 at the end thereof, has a cylindrical opening extending upwardly from the lower end thereof. The opening forms a wall and at least one axial slot 3 is formed in the wall and an outer thread 4 is formed on the upper part of the wall. A driven cylinder 5 which is open at both ends is mounted to axially slide and rotate in telescoping relation within the cylinder 1, and a clutch or sleeve portion 6 is provided which surrounds an intermediate portion of cylinder 5 and may be integral with or fastened to the cylinder 5. Clutch portion 6 is formed with at least one axial slot or groove 7 in its outer surface which registers with the slot 3 of cylinder 1 and is open at the top end thereof. The top end of groove 7 (see FIG. 3) extends substantially axially at one side is and contoured to form an angled or rounded side at the outer edge 7'. A cylindrical roller 8 and a ball 9 at the bottom of the roller normally engage and are axially slidably within the slot 3 and groove 7, so that the driving cylinder 1 can normally drive the clutch driven cylinder 5. An axially movable ring 10 is slidable on the upper portion of cylinder 5 and engages the roller 8. A compression spring 11 between the ring 10 and the inner top wall of the cylinder 1 urges the roller 8 and ball 9 downwardly.

A skirt or sleeve 12 is rotatably and axially slidable around a lower portion of the driven cylinder 5, and an upper portion has an inner diameter enlarged to form a step 13 (FIG. 3). A twist or torsion spring 14 is placed inside the upper inner wall of the large diameter of the skirt 12, and has its upper end anchored to the lower end of clutch sleeve 6 and its lower end anchored to the step 13 of skirt 12. The top end of skirt 12 slidably contacts the lower end of clutch sleeve 6, while a lower inner step 15 of the skirt 12 slidably contacts the upper side of a stop ring 16 secured on the outer wall of clutch cylinder 5, so that the skirt 12 may not move axially relative to the clutch cylinder 5. Chuck means 17, which may be of a conventional type for holding a tap at the lower end thereof, has its upper portion adapted to fit within the lower portion of clutch cylinder 5 and has a peripheral groove 18 formed adjacent the top thereof, the groove having a semi-circular, axial section. Corresponding to the axial position and the diameter in axial section of the groove 18, the clutch cylinder 5 has at least one radial hole 19 formed through it while the skirt 12 is formed with at least one radial recess 20 in the inner wall of the small diameter. The angular positions of the hole 19 and the recess 20 relative to the anchoring of the twist spring 14, must be predetermined so that, when the upper portion of the chuck 17 is attached inside the clutch cylinder 5, the twist spring 14 normally causes a radially movable ball 21 to engage both the groove 18 and hole 19 but be angularly displaced and disengaged from the recess 20. Thus, the chuck 17 normally is immovable axially relative to the clutch cylinder 5 through the ball 21. The chuck 17 is required to rotate with the sleeve 5 by axial projections 54 (FIG. 1) formed on the chuck 17, which extend into axial notches or recesses 53 (FIG. 3) formed in the lower edge of the sleeve 5. To remove the chuck 17 from the cylinder 5, the skirt 12 is angularly turned relative to the cylinder 5 in either direction against the twist force of spring 14 until the recess 20 is aligned angularly with the hole 19 where the ball 21 can move radially away from the groove 18 and into the recess 20 so that the chuck 17 may be removed downwardly.

References is made now to FIGS. 1 and 4. Fixedly mounted at its upper end to the inner top wall of driving cylinder 1, e.g. by being threaded thereinto, is a rod or bolt 22 extending axially downward and terminating in an enlarged head 23. A spring receiver 24 is formed with a central hole 25 through the top wall thereof for sliding movement along the rod 22, and it has a radial flange 26 formed at the open, lower end thereof for sliding inside the driven cylinder 5. A snap or stop ring 27 fixed to an inner, upper wall of cylinder 5 normally engages the upper side of flange 26 to prevent the cylinder 5 from moving downwardly relative to the receiver 24. A relatively weak and long compression spring 29 is placed between the top wall of the receiver 24 and a bearing 28 provided on the head 23 of rod 22 to urge the driven cylinder 5 upwardly, or inwardly, of the driving cylinder 1 through the retainer 24 and stop ring 27, such that the top wall of the receiver 24 normally abuts on the inner, upper wall of cylinder 1. The top end of clutch cylinder 5 terminates at a level that is normally spaced from the inner, upper wall of cylinder 1.

The inner side of the clutch cylinder 5 is provided at an axially intermediate level with a step or stop means 30 for engagement with an annular stop washer 32, the step 30 stopping the washer from moving downwardly. An annular spacer 31, which could be integral with the stop washer 32, is placed on the upper side of the stop washer 32. A relatively strong compression spring 33 is placed between the flange 26 of receiver 24 and the top end of spacer 31 to urge the clutch cylinder 5 axially outwardly or downwardly as seen in FIG. 1, away from the retainer 24, such that the top end of cylinder 5 is normally spaced from the inner, upper wall of the driving cylinder 1. The spring 33 serves to absorb shock when a tap in the chuck 17 strikes or begins to bite into the work piece and to help the biting by the reaction of the spring 33.

Being slidable within the clutch cylinder 5, an annular ball keeper 34 is provided to hold the ball 21 when the clutch 17 is removed. The keeper 34 is formed with a peripheral groove 35 and is urged downwardly by a relatiely weak compression spring 36 having its upper end contacting the stop washer 32 so that the keeper engages and presses downwardly against the top side of chuck 17 when attached. To detach the chuck 17, the skirt 12 is turned to align the recess 20 of the skirt 12 with the hole 19 of the cylinder 5, so that the ball 21 is able to move radially out of the groove 18 and into the hole 20. The chuck 17 then is moved downwardly and the force of spring 36 causes the keeper 34 to closely follow the chuck 17. The keeper 34 moves downwardly until the upper edge of the groove 35 engages a stop 37 (FIG. 1) fixed to the inner surface of the cylinder 5, which stops the keeper 34 from moving further downwardly. At this level, the peripheral edge near the bottom of the keeper 34 is adjacent the ball 21 and this edge holds the ball 21 in the hole 19 and the recess 20. Upon reattachment, the chuck 17 is simply inserted into the cylinder 5 and pushed upwardly to lift the ball keeper 34, above the ball 21 and the ball 21 subsequently moves into the groove 18 when the recess is aligned radially with the peripheral groove 18 of the chuck. When the ball 21 is in the groove 18, the skirt 12 is turned automatically by the force of twist spring 14 to its normal position where the groove 20 is displaced from the hole 19 and a solid part of the skirt 12 overlies the ball 21.

Figure 2:
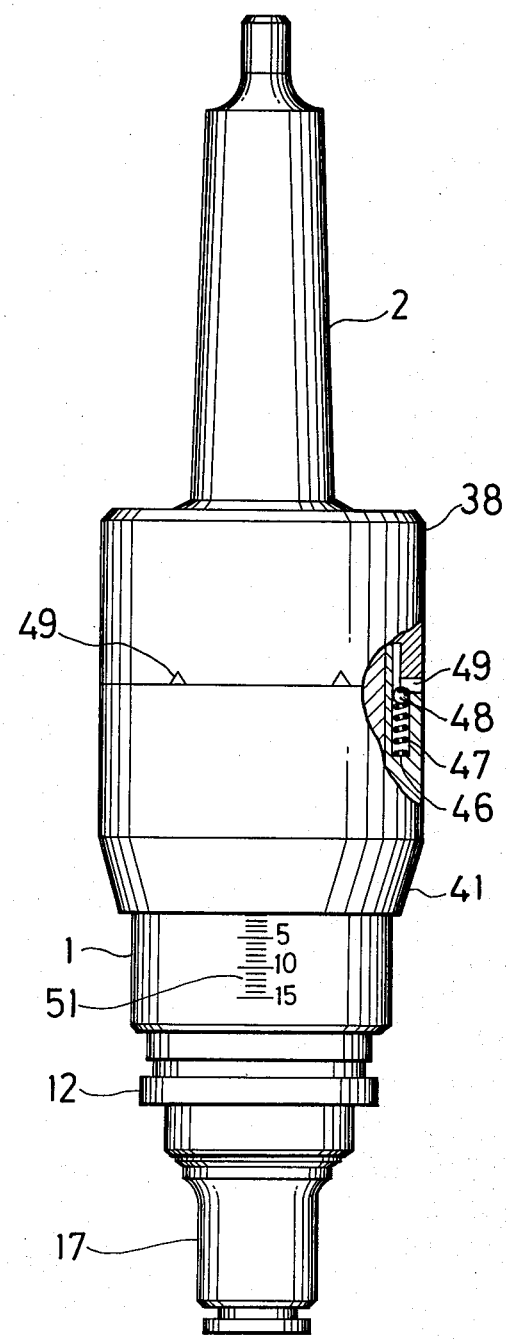
FIG. 2 is a side view thereof partially in axial section at an angle different from that of FIG. 1.
Figure 5:
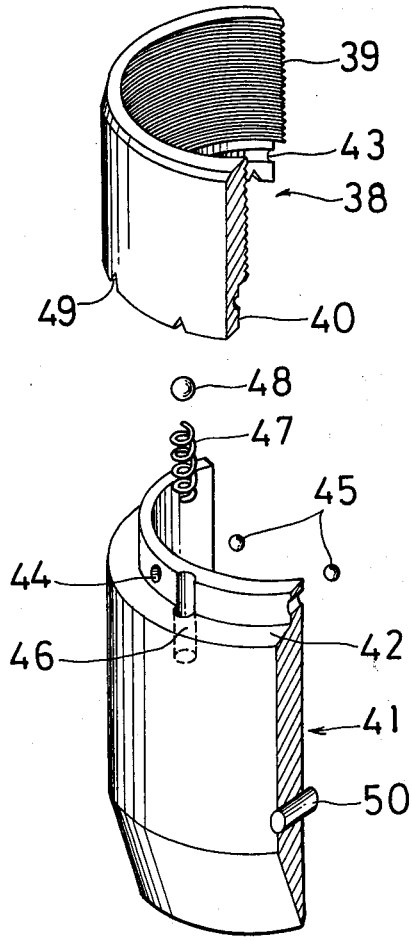
Figure 6:
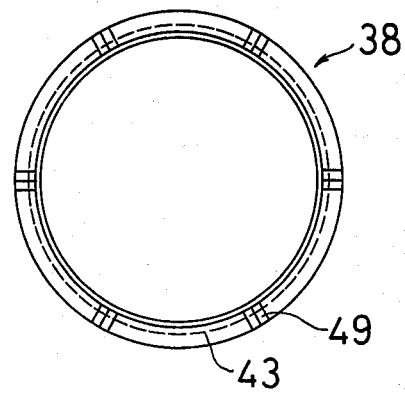
FIG. 6 is a bottom view of an adjusting sleeve thereof.
Figure 7:
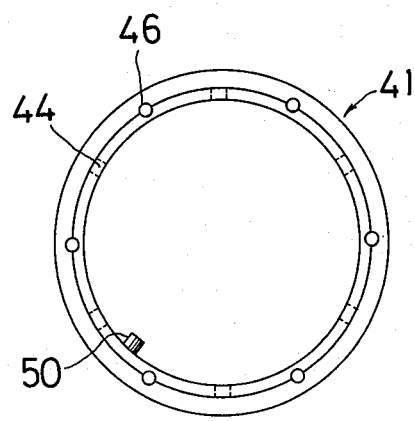
FIG. 7 is a top view of an outer sleeve thereof.

FIGS. 5-7 together with FIGS. 1 and 2, illustrate a most important part of the invention. An upper adjusting sleeve 38 has an inner thread 39 for engagement with an outer thread 4 of driving cylinder 1 such that turning movement of upper sleeve 38 relative to the cylinder 1 causes the former to change its axial position relative to the latter. An inner, lower wall of sleeve 38 has a diameter which is enlarged to form a step 40. A lower, outer sleeve 41 is slidable axially around the driving cylinder 1 and keeps the roller 8 and ball 9 from moving outward from the slot 3. Lower sleeve 41 has an outer, upper wall of a diameter reduced to form a step 42 for mating with the step 40 of the upper sleeve 38. The inner, lower wall of the upper sleeve 38 is formed with an annular groove 43 while the outer, upper wall of lower sleeve 41 is formed with at least one hole 44 therethrough. One of a plurality of balls 45 engages both the groove 43 and each hole 44 so that the upper sleeve 38 can turn but cannot move relative to the lower sleeve 41. Preferably plural, axial holes 46 are formed at regular intervals and open in the step 42. Each hole 46 receives a compression spring 47 for upwardly urging a ball 48. The lower end of upper sleeve 38 is formed with ratchet recesses 49 therethrough the recesses preferably being triangular and each of which must be sized and shaped to keep the associated ball 48 from escaping from the hole 46. With the balls 48 and recess 49 in ratchet engagement, the upper sleeve 38 is rotatable with the lower sleeve 41 but, by turning the upper sleeve relative to the lower sleeve against the force of the springs 47, each ball 48 can snap into any one of the other ratchet recesses 49.

A pin 50 fixed to the lower sleeve 41 projects radially inwardly to axially slidably engage the slot 3 of driving cylinder 1 so that the lower sleeve 41 can rotate with and axially slide relative to the cylinder 1. Thus, snap engagement of the upper sleeve 38 with the balls 48 at different angles will selectively hold the lower sleeve 41 at axially different positions. The pin 50 contacts or engages the bottom of ball 9 within the slot 3 to keep it from moving downwardly.

Driving cylinder 1 has an axial scale 51 (FIG. 2) on an outer, lower wall thereof such that the normal, vertical distances between the lower end of angled scale 7' of groove 7 and the center of ball 9 is normally indicated at the lower end of sleeve 41.

In operation, with a tap fixed in the chuck 17 attached to the clutch cylinder 5, the driving cylinder 1 is rotated in the direction of an arrow 52 (FIG. 3) to drive the tap through the roller 8, ball 9 and clutch cylinder 5. The spindle is moved downwardly until the tap materially bites a peice of work. With the shank 2 or cylinder 1 held at this position, the rotation of the spindle is continued so that the tapping proceeds and the driven cylinder 5 goes downwardly relative to the cylinder 1 against the weak force of spring 29. Because the ball 9 engages the pin 50, ball 9 and roller 8 move upwardly relative to the groove 7 of clutch cylinder 5. When the center of ball 9 has reached the lower end of angled side 7' of groove 7, the ball 9 will slip along the angled side 7' against the force of spring 11 and knock together with the roller 8 on the side 7' so that the driving cylinder 1 idles to stop the tapping operation.

The so tapped depth substantially or approximately equals the sum of the value normally indicated by the scale 51 and the distance that the spindle has been moved after the lower end of the tap reached the work.

Then reversely rotating the driving cylinder 1 will allow the ball 9 to engage the other top corner of the straight side or right angle of groove 7 so that the tap is reversely rotated and removed from the work.

The shock when the tap strikes or begins biting the work is absorbed by the compression spring 33.

The depth to be tapped can thus be changed easily by turning the upper adjusting sleeve 38 to axially move the pin 50 of the lower sleeve 41, while such change of depth can be observed conveniently from the scale 51.

If the bottom of roller 8 is rounded, it will not be necessary to use the ball 9.

What is claimed is:

1. A tapping spindle comprising a first cylinder having a shank at the top thereof, opening at the bottom thereof and formed with at least one axial slot in a side wall thereof, a second cylinder reciprocatable and rotatable within said first cylinder and spring-urged axially inwardly of said first cylinder; said second cylinder having at leat one axial groove in an outer wall thereof, said groove opening at one end thereof, the open end having one edge of a substantially right angle and the outer edge contoured off; and a slidable roller normally engaging both said slot and groove and spring urged axially outwardly of said first cylinder characterized by a sleeve reciprocatable around said first cylinder and having a radial pin fixed thereto and projecting radially inward to reciprocatably engage said slot; said pin stopping said roller from moving axially inwardly of said groove; and means for selectively holding said sleeve at predetermined axially various positions relative to said first cylinder.

2. A tapping spindle as in claim 1, wherein said means for selectively holding said sleeve comprises another sleeve around said first cylinder and in threading engagement with said first cylinder; said another sleeve being immovable axially relative to and in ratchet engagement with said reciprocatable sleeve; such that the turning of said another sleeve around said first cylinder allows said reciprocatable sleeve to move axially relative to said first cylinder.

3. A tapping spindle as in claim 1, and further comprising first spring means and a spring retainer slidable within said second cylinder and urged by said first spring means inwardly of said first cylinder to normally abut on an inner, upper wall of said first cylinder, a stop secured to said second cylinder and engaged by said retainer to stop said second cylinder from moving axially outwardly relative to said retainer, and second spring means for urging said second cylinder axially outwardly apart from said retainer, such that the top end of said second cylinder normally is spaced from said inner, upper wall of said first cylinder.

* * * * *